Feb. 4, 1930.  F. E. TUGWELL  1,746,095
SAFETY DEVICE FOR LIQUID SUPPLY LINES
Filed Jan. 24, 1928
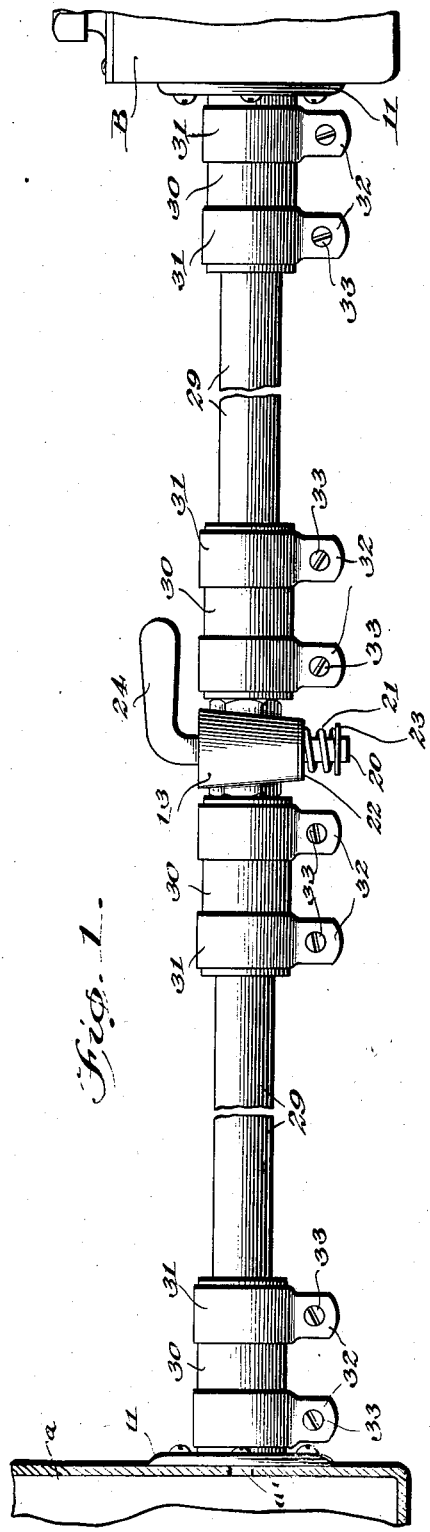
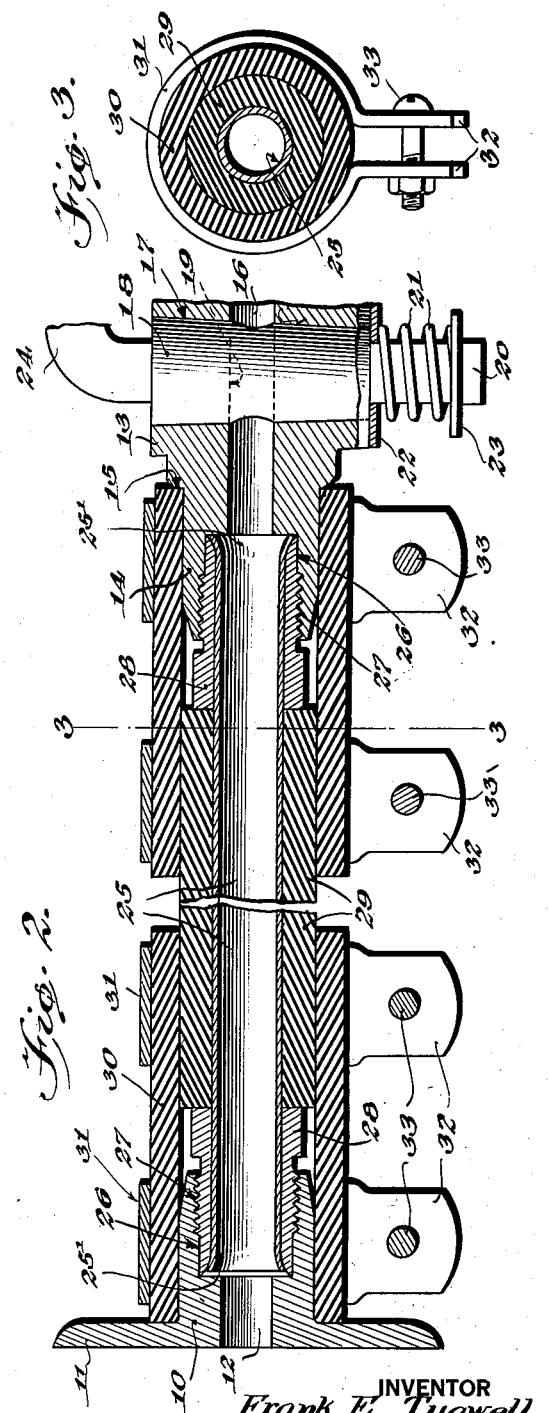
INVENTOR
Frank E. Tugwell
BY
ATTORNEY Patented Feb. 4, 1930

1,746,095

UNITED STATES PATENT OFFICE

FRANK E. TUGWELL, OF PENSACOLA, FLORIDA

SAFETY DEVICE FOR LIQUID-SUPPLY LINES

Application filed January 24, 1928. Serial No. 249,183.

This invention relates to improvements in safety devices for liquid supply lines generally, and more particularly to a type of such device adapted for use in preventing failure of a liquid supply, such as the fuel and oil supplies for internal combustion engines or the like, because of breakage or other source of leakage in the supply lines, such as in its connections.

The principal object of the invention is to provide for a device of the character mentioned, and one of an extremely simple and inexpensive construction and arrangement of parts, and which will be easily and readily installed for effective and efficient use in connection with liquid fuel or oil lines already in position of operation.

Another object of the invention is to provide for a device of the class set forth, and one which is of practical and particular value for application to and for use in connection with the fuel and oil supply lines of the internal combustion motors of air craft and the like to prevent failure of these types of engines during periods of flight or travel by reason of the stoppage or loss of the fuel or oil due to breaks or leaks in the supply lines, such as otherwise often occurs in the latter from effects of excessive vibration to which they are usually subjected.

With the foregoing and other equally important objects and advantages in view, the invention resides in the certain new and useful combination, construction and arrangement of parts as will be hereinafter more fully described, set forth in the appended claims, and illustrated in the accompanying drawing, in which:

Figure 1 is a side elevation of a practical embodiment of the invention as it appears when operatively associated with a pipe line extending between a liquid supply container and a device to be supplied with a fuel from the container, and with a cut-off valve interposed in the pipe line, Figure 2 is a vertical longitudinal section through a portion of a pipe line equipped with the safety means in accordance with the invention, and Figure 3 is a vertical transverse section taken on the line 3—3 of Figure 2.

Referring to the drawing, wherein similar characters of reference designate corresponding parts throughout the several views thereof, the preferred embodiment of the invention, as shown therein, comprises a nippled fitting 10, which is flanged, as at 11, for attachment to the outer wall of a liquid supply container or the like a at one end of a pipe line, and to the outer wall of a device b, to be supplied with the liquid contents of the container a at the other end of the pipe line. The flange portions 11 of the nippled fitting 10 are each shaped to the particular configuration or contour of the wall of the container or device to which they are to be attached, and the bores 12 of the nipple portions 10 open through the flange portions 11 for positioning in alinement with the outlet opening a' of the container a on the one hand, and the intake opening (not shown) of the device b on the other hand.

In the pipe line shown, a cut-off valve is interposed at an intermediate point in the pipe line, and this valve comprises a body 13, which is elongated in a manner to provide oppositely disposed reduced end portions or nipples 14, the inner or connected ends of which are shouldered, as at 15, for purposes which will presently be apparent. A bore 16 extends centrally through the body 13, and each of the nippled portions 14 thereof. A downwardly tapering valve seat 17 is formed vertically through the center of the body 13 for the seating therein of a rotatable valve member or plug 18, diametrically through which a bore or duct 19 is provided to aline with the bore or duct 16, of the nippled portions 14, when the valve member or plug 18 is turned to proper position for the purpose.

The lower end of the valve member or plug 18 is formed to provide a reduced extension 20, which projects outwardly of the lower end of the valve seat 17 for a distance below the under side of the valve body 13, and encircling this extension 20 is a tensioning device, preferably in the form of a coil spring 21, which is arranged to cooperate with the valve member or plug in a manner to frictionally retain the same in any desired open or closed position. To facilitate the proper functioning of the spring 21, a washer 22 is positioned on the extension 20 above the same, and is tensioned thereby upwardly against the under side of the valve body 13 and the lower end face portion of the valve member or plug 18 surrounding the extension 20, while a second washer or flange 23 is secured in position on the extension 20 immediately below the lower end of the spring 21, substantially as shown. A handle 24 is provided at the upper end of the valve member or plug 18 to facilitate the proper operation of the latter.

The nippled fittings 10 of the liquid container $a$ and the liquid receiving or utilizing device $b$ are connected to the nippled extensions 14 of the valve body 13 by suitable lengths of metal tubing 25, preferably of copper, whereby the liquid contents of the container $a$ will pass through the pipe line, thus formed, to the device $b$, whenever the valve member or plug 18 is turned to open or partially open position. For the purpose of attaching the ends of the metal tubing 25 to the nippled portions of the fittings 10 and the valve body 13, the free ends of each of these nippled portions are identically counterbored, as at 26, and partially screw threaded, as at 27, to receive therein a union 28, which has the inner end of its bore flared complementally to and for retained engagement with the flared end 25′ of the tubing 25.

With a liquid supply line, as thus constructed and arranged, or constructed and arranged in any other similar or usual manner, the invention contemplates the encasement of the exposed portions of the metal tubing 25, extending between the opposed outer ends of the oppositely arranged unions 28, in a length of flexible tubing 29, which is arranged to have its opposite ends preferably abutted against the adjacent outer ends of the unions 28. This tubing 29 may be made from any suitable material, such as rubber or the like, which will be impervious to moisture, or otherwise liquid proof. After a pipe line has been assembled with the length of flexible tubing 29 encasing the normally exposed portions of the metal tubing 25 between opposed unions 28, a short length of flexible tubing 30, of the same or similar tubing as that of the tubing 29, but of a larger interior diameter, will be engaged over each end of a length of said tubing 29, and over the nippled portions of the nippled fittings 10 and the similar portions 14 of the valve body 13, and in a manner that the joints between the ends of the tubing 29 and the opposed ends of the unions 28, and the joints between the unions 28 and the nippled portions connected by the latter, will be completely encased thereby. The opposite end portions of the several tube sections or sleeves 30 are encircled by split clamps 31 which may be of any usual or commercial form of adjustable hose clamp device suitable for the purpose. With the flexible tubing 29 encasing the tubing 25 of any fuel or oil supply line leading to the device or carburetor $b$ of an internal combustion engine from a supply container $a$, and the flexible tubing sections or sleeves 30 secured in position by the clamps 31, and in a manner to encase the coupled ends of the tubing 25 to the adjacent ends of the flexible tubing 29, it will be readily apparent that any leakage of the fuel or oil at the joints of the unions 28, or from a break in the copper tubing 25, will be retained against loss by being confined within the tubing 29 and the tubing sections or sleeves 30, and that, upon the filling up of the spaces between the sleeves 30 and the unions 28 will, thereafter, prevent further leakage from the joints, or break or breaks should any of the latter occur in the metal tubing 25, and the supply of fuel or oil will otherwise remain uninterrupted. When a leak or break is suspected, or for any other reason an inspection of the metal pipe line and its connections is desired, access may be readily had to the same by loosening up or slacking off the hose clamps 31, and then slipping the sleeves 30 along the adjacent ends of the flexible tubing 29, when the joints between the opposite ends of the unions 28 and the connected and abutted ends of the nipples 10 and the flexible tubing 29 will be exposed to view. If no liquid shows about the joints, it will be certain that the line is in perfect working condition, and the sleeves 30 will then be returned to normal position and secured by the clamps 31. However, if liquid shows at the ends of the flexible tubing 29, it will be instantly known and understood that the metal tubing 25 is defective, i. e., cracked or broken, in which case the affected sections of the pipe line can then be replaced.

It is to be noted that it is the usual practice to use metal fuel and oil lines instead of rubber, or other similar flexible tubing, since such tubing, particularly when of rubber, tends to dissolve, and particles of the same are conveyed to the engine and clog the mechanism thereof. However, unsupported metal tubing suffers from extreme vibration and often breaks, so as to necessitate a stopping of the engine when a leak is discovered or, if the leakage remains undetected until the fuel or oil supply is exhausted the engine will, of course, stop of its own accord, but, in the use of the present arrangement, the metal tubing is substantially supported against excessive or otherwise injurious vibrations. Further, the metal tubing is also insulated by the flexible tubing encasement against all possible contact with any of the electric connections of the ignition system of an engine, and consequently fires and explosions are thereby prevented when a combustible or explosive fluid is being transferred through a pipe line. Most important of all these several salient features of the invention is the fact that the pipe line will still supply the liquid fuel or oil even if the metal tubing becomes cracked or broken, or the joints of the same become leaky.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

Having thus fully described the invention, what is claimed is:

1. A liquid fuel or oil supply line comprising a length of metal tubing, nippled attaching members arranged adjacent the opposite ends of the tubing, unions coupling the opposite ends of the tubing to the nipples of said attaching members, a length of flexible liquid proof tubing snugly encasing the metal tubing between said unions, lengths of the flexible tubing engaged over the nipples of the said attaching members and the adjacent ends of the said flexible tubing and housing the unions within the same, and clamping members detachably securing the opposite ends of the said last-mentioned lengths of flexible tubing to the said nipples and adjacent flexible tubing ends.

2. A liquid fuel or oil supply line comprising a length of metal tubing, nippled attaching members arranged adjacent the opposite ends of said tubing, unions coupling the opposite ends of the tubing to the nipples of said attaching members, a length of flexible liquid proof tubing snugly encasing the metal tubing between said unions, lengths of the flexible tubing of the same material as that of the flexible tubing engaged over the nipples of the said attaching members and the adjacent ends of the said flexible tubing and housing the unions within the same, and clamping members detachably securing the opposite ends of the said last-mentioned lengths of flexible tubing to the said nipples and adjacent flexible tubing ends.

3. A liquid fuel or oil supply line for aircraft and the like comprising a composite length of metal tubing, and section coupling devices, a length of flexible tubing encasing each section of the metal tubing, lengths of the flexible tubing telescopically engaged over the opposed ends of the first-named lengths of flexible tubing and enclosing the said coupling devices, and split clamping bands detachably securing the overlapped ends of said lengths of flexible tubing together.

Signed at Pensacola, in the county of Escambia and State of Florida, this 14th day of Jan., A. D. 1928.

FRANK E. TUGWELL.